No. 826,030. PATENTED JULY 17, 1906.
L. G. HARPER.
MILKING DEVICE.
APPLICATION FILED NOV. 14, 1905.

2 SHEETS—SHEET 1.

Witnesses:
G. Kesler

Inventor
Louis G. Harper
By James L. Norris
Atty.

No. 826,030. PATENTED JULY 17, 1906.
L. G. HARPER.
MILKING DEVICE.
APPLICATION FILED NOV. 14, 1905.

2 SHEETS—SHEET 2.

Witnesses:
C. D. Kesler

Inventor
Louis G. Harper
By James L. Norris
Atty.

UNITED STATES PATENT OFFICE.

LEWIS GOODWIN HARPER, OF WEST CHESTER, PENNSYLVANIA.

MILKING DEVICE.

No. 826,030.

Specification of Letters Patent.

Patented July 17, 1906.

Application filed November 14, 1905. Serial No. 287,275.

*To all whom it may concern:*

Be it known that I, LEWIS GOODWIN HARPER, a citizen of the United States, residing at West Chester, in the county of Chester and State of Pennsylvania, have invented new and useful Improvements in Milking-Devices, of which the following is a specification.

This invention relates to a milking device having a yieldable structure to readily conform to the contour of a teat and of a soft nature to avoid injury to the latter.

The present invention constitutes an improvement on that disclosed in my application, Serial No. 262,677, filed May 27, 1905, and allowed July 12, 1905.

In the improved milking device the essential features consist of a yielding or flexible body to fit over a teat having closing tape or band means engaging the same to compress it, the said body resuming its normal open position when released.

The invention also consists in the details of construction and arrangement of the several parts, which will be hereinafter more fully described and claimed.

Figure 1:
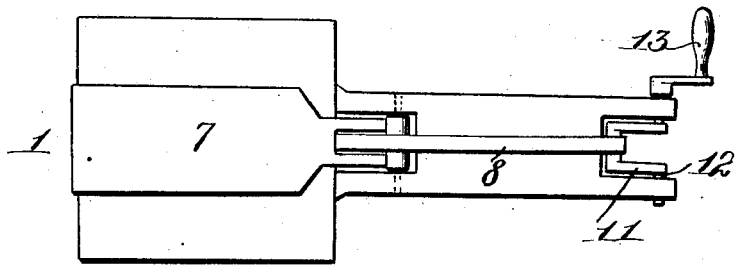
Figure 2:
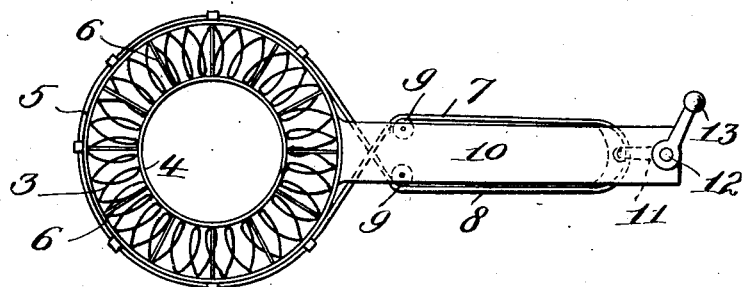
Figure 3:
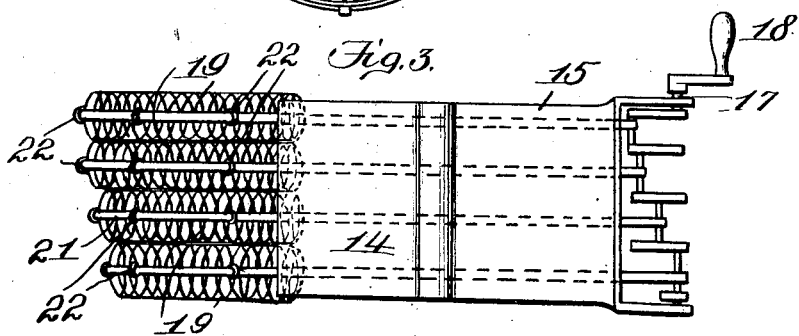
Figure 4:
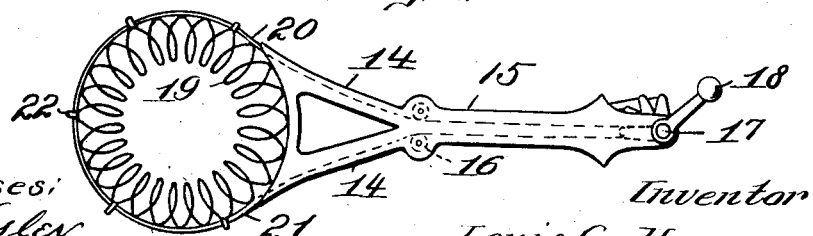
Figure 5:
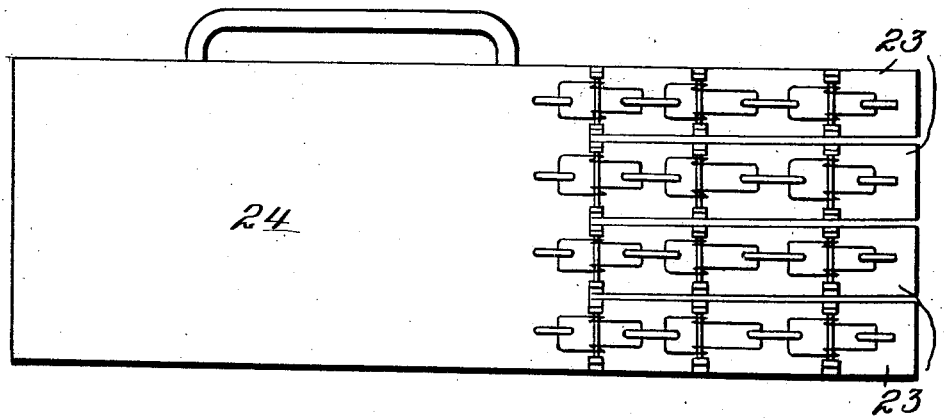
Figure 6:
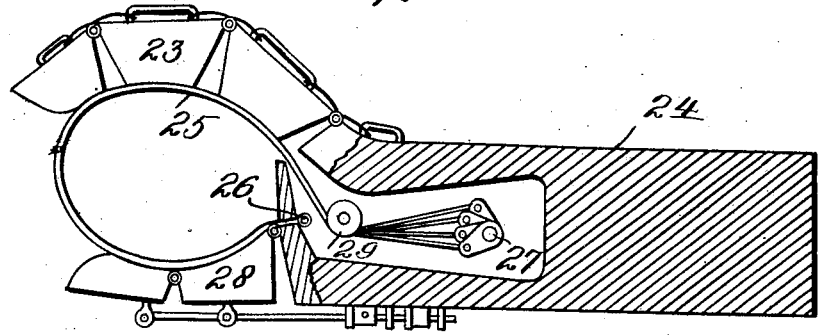

In the drawings, Figure 1 is a side elevation of a milking device embodying the features of the invention. Fig. 2 is a horizontal section of the device. Fig. 3 is a side elevation of a modified form of the milking device. Fig. 4 is a horizontal section through the device shown by Fig. 3. Fig. 5 is a side elevation of a milking device embodying the features of the construction disclosed in my aforesaid application and showing the improved compressing structure of the present invention applied thereto. Fig. 6 is a top plan view of the structure shown by Fig. 5.

Similar numerals of reference are employed to indicate corresponding parts in the several views.

The numeral 1 in all the forms of the device shown designates a yielding teat-engaging body, preferably of tubular structure and readily applicable upwardly over and withdrawable downwardly from the teat, the said body having a central opening of such normal dimensions that it may be made to operate with teats of various diameters. In the constructions shown variations in the diameter of the teats may be accommodated without adjusting the yielding body 1, and such body is compressed by the use of one or more tapes constructed either of steel or other suitable spring metal or of woven fabric.

Referring particularly to the construction of the milking device as illustrated by Figs. 1 and 2, the compressing-body is mainly composed of a filling 3, consisting of a coiled spring of suitable dimensions, or a number of springs may be used, in accordance with the depth of the body of the device. The spring structure constituting the filling 3 is held between inner and outer walls 4 and 5, of suitable material, either rubber, fabric, or other substance adapted for the purpose, and at regular intervals these walls are connected by radially-disposed cords or analogous devices 6, which also assist in holding the filling in place between the said walls. Surrounding the outer wall 5 are tapes or bands 7 and 8, which have a reverse compressing operation or are drawn in reverse directions against the said wall. These bands or tapes pass over guide-rollers or other analogous guiding means 9, secured to a support 10, to which the body of the milking device, including the inner and outer walls 4 and 5, is connected. These tapes are united or connected to a crank 11, held in the support and exteriorly operative through the medium of a shaft 12, of which said crank forms a part, the one end of the said shaft having a suitable crank-handle 13, as shown. When the shaft 12 is turned in proper direction, it exerts a uniform drawing tension on the bands or tapes 7 and 8 and compresses the body of the milking device, and when the crank 11, to which the tapes are attached, has come around to a certain position the said tapes are released and the body automatically expands, owing to the resilient filling.

In the form of the device shown by Figs. 3 and 4 the body is connected to the branches 14 of a tubular support 15, constituting the main supporting means for the device. At the juncture of the branches 14 with the main part of the support 15 a roller 16 is interposed to serve as a guiding means, and in the rear extremity of the said main portion of the support is a crank-shaft 17, having an exteriorly-exposed operating-handle 18. The body of the milking device in this instance consists of a coil-spring or a series of springs 19, and passed thereover are reversely-operating tapes 20 and 21, the spring 19 being connected at intervals to the said tapes by loops 22. The tapes 20 and 21 in this instance are preferably of metal, and when they are free to relax they operate to draw outwardly on the spring 19, which constitutes the resilient element of the body in this instance, and over-come any tendency of the said spring or coils to stick or remain in abnormal position after use and subsequent to relaxation thereof.

In Figs. 5 and 6 a plurality of simultaneously-movable jointed fingers 23 are used and connected to a support 24, and coöperating with said fingers is a single tape or band 25, secured at one end, as at 26, to the support 24 and at the opposite extremity engaging a crank-shaft 27, held in the support and operative from the exterior of the latter. The fingers 23 coöperate with a digit or analogous element 28, and the opening between the ends of the fingers and the digit is closed by the tape, the latter being guided over a suitable roller or other analogous device 29, held by the support.

It will be observed that the same principle is embodied in all the forms of the device shown, and though springs have been described as preferably constituting the resilient filling means for the body of the milking device in Figs. 1, 2, 3, and 4 it will be observed that other suitable soft material might be employed, the modified forms of the body being intended to indicate that I contemplate using any suitable yielding body.

As before indicated, the improved tubular milking device is slipped upwardly over the teat, and after it is applied the body is compressed against the teat and institutes the necessary pressure on the latter to cause the milk to flow therefrom. The body is then released and resumes its normal position and subsequently is compressed by operating the crank-shaft. Successive similar operations simulating the pressure of the human hand on a teat will be effected until the cow is thoroughly milked. It will be understood that one of the improved milking devices may be used and shifted from time to time to the different teats. If desired, more than one of the milking devices may be used and supported similarly to the means referred to in my aforesaid allowed application.

In addition to the modified structures illustrated it is intended to vary the proportions and minor details within the scope of the invention.

Having thus described the invention, what is claimed is—

1. A milking device having a flexible compressible body, and flexible means passing around the body and operative to contract the latter.

2. A milking device having a compressible tubular body, and a compressing means passing around the said body.

3. A milking device having a resilient compressible body, and compressing means passing around the body.

4. A milking device having a compressible tubular body, and means engaging the said body for compressing the same.

5. A milking device having a compressible body provided with resilient means for automatically expanding the same, and means for compressing said body.

6. A milking device having a body with a resilient filling, and means engaging the body for compressing the same.

7. A milking device having a flexible compressible body, and one or more tapes or bands surrounding the same and operative to institute a pressure with relation thereto.

In testimony whereof I have hereunto set my hand in presence of two subscribing witnesses.

LEWIS GOODWIN HARPER.

Witnesses:
R. HAINES PASSMORE,
WM. S. WINDLE.